United States Patent
Goebel

(10) Patent No.: US 9,537,160 B2
(45) Date of Patent: Jan. 3, 2017

(54) OPERATIONAL METHOD FOR A SIMPLIFIED FUEL CELL SYSTEM

(75) Inventor: Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 996 days.

(21) Appl. No.: 13/397,458

(22) Filed: Feb. 15, 2012

(65) Prior Publication Data

US 2013/0209907 A1 Aug. 15, 2013

(51) Int. Cl.
*H01M 8/04* (2016.01)
*H01M 8/06* (2016.01)
*H01M 8/24* (2016.01)

(52) U.S. Cl.
CPC ..... *H01M 8/04231* (2013.01); *H01M 8/04955* (2013.01); *Y02E 60/50* (2013.01)

(58) Field of Classification Search
USPC .................................................. 429/408–451
See application file for complete search history.

(56) References Cited

U.S. PATENT DOCUMENTS

| | | |
|---|---|---|
| 6,858,336 B2 | 2/2005 | Reiser |
| 7,141,324 B2 | 11/2006 | Margiott |
| 2005/0031917 A1* | 2/2005 | Margiott ........... H01M 8/04201 429/429 |
| 2011/0143241 A1* | 6/2011 | Tighe et al. .................. 429/428 |

* cited by examiner

*Primary Examiner* — Basia Ridley
*Assistant Examiner* — Caitlin Wilmont
(74) *Attorney, Agent, or Firm* — John A. Miller; Miller IP Group, PLC

(57) ABSTRACT

A system and method for reducing the corrosive effects of an air/hydrogen front in a fuel cell stack. The method includes shutting down the fuel cell stack and then initiating a hydrogen sustaining process where hydrogen is periodically injected into an anode side of the fuel cell stack while the stack is shut down for a predetermined period of time. The method determines that the hydrogen sustaining process has ended, and then purges the anode side and a cathode side of the fuel cell stack with air after the hydrogen sustaining process has ended and the stack is still shut-down.

18 Claims, 2 Drawing Sheets

OPERATIONAL METHOD FOR A SIMPLIFIED FUEL CELL SYSTEM

BACKGROUND OF THE INVENTION

Field of the Invention

This invention relates generally to a system and method for reducing the frequency and impact of damaging air/hydrogen fronts in a fuel cell stack and, more particularly, to a system and method for purging the cathode and anode sides of a fuel cell stack with air while the fuel cell system is shut down after a procedure for periodically injecting hydrogen into the stack during the shut down has ended.

Discussion of the Related Art

Hydrogen is a very attractive fuel because it is renewable and can be used to efficiently produce electricity in a fuel cell with no harmful emissions. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode electrodes, or catalyst layers, typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Each MEA is usually sandwiched between two sheets of porous material, the gas diffusion layer (GDL), that protects the mechanical integrity of the membrane and also helps in uniform reactant and humidity distribution. MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. The fuel cell stack also receives an anode hydrogen input gas that flows into the anode side of the stack. Not all of the oxygen is consumed by the stack and some of the air is output as a cathode exhaust gas that may include water as a by-product of the chemical reaction taking place in the stack.

The fuel cell stack includes a series of bipolar plates positioned between the several MEAs in the stack, where the bipolar plates and the MEAs are positioned between two end plates. The bipolar plates include anode side and cathode side flow distributors, or flow fields, for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

When a fuel cell system is shut down, unreacted hydrogen gas remains in the anode side of the fuel cell stack. This hydrogen gas is able to diffuse through or cross over the membranes and react with the oxygen on the cathode side of the stack. As the hydrogen gas diffuses to the cathode side, the total pressure on the anode side of the stack is reduced. Some oxygen will be left in the cathode plumbing, and will slowly re-enter the cathode flow-field, either by convective or diffusive forces. Most of the oxygen will react with hydrogen that is locally present in the cell. Eventually, the local hydrogen will be consumed, and oxygen will start to concentrate. Eventually, oxygen will locally permeate the membrane to the anode.

When air enters the anode side of the stack it generates an air/hydrogen front that creates an elevated potential in the anode side, resulting in a lateral flow of hydrogen ions from the hydrogen flooded portion of the anode side to the air-flooded portion of the anode side. The lateral current combined with the high lateral ionic resistance of the membrane produces a significant lateral potential difference (~0.5V) across the membrane. A locally high potential is produced between the air-filled cathode side opposite the air-filled portion of the anode side. The high potential adjacent to the electrolyte membrane causes rapid carbon corrosion, which causes the electrode carbon layer to thin. This decreases the support for the catalyst particles, which decreases the performance of the fuel cell.

In automotive applications, there are a large number of start and stop cycles required over the life of the fuel cell system, each of which may generate an air/hydrogen front as described above. Targets of 40,000 start and stop cycles would be considered reasonable. Leaving a stack in an oxygen-rich atmosphere at shut-down results in a damaging air/hydrogen event at both shut-down and start-up, where 2 to 5 µV of degradation per start and stop cycle is plausible. Thus, the total degradation over 40,000 start and stop cycle events is on the order of 100 or more mV. If the stack is left with a hydrogen/nitrogen mixture at shut-down, and the system is restarted before appreciable concentrations of oxygen have accumulated, cell corrosion during the shut-down and subsequent restart is avoided.

It is known in the art to purge the hydrogen gas out of the anode side of the fuel cell stack at system shut-down by forcing air from the compressor into the anode side at high pressure. However, the air purge still creates an air/hydrogen front that causes at least some corrosion of the carbon support, as discussed above, even though it is short in duration. Another known method in the art is to provide a cathode re-circulation to reduce carbon corrosion at system shut-down, as described in the commonly owned U.S. patent application Ser. No. 11/463,622, titled, "Method for Mitigating Cell Degradation Due to Startup and Shutdown Via Cathode Re-Circulation Combined with Electrical Shorting of Stack," filed Aug. 10, 2006, assigned to the assignee of this application and herein incorporated by reference. Particularly, it is known to pump a mixture of air and a small amount of hydrogen through the cathode side of the stack at system shut-down so that the hydrogen and oxygen combine in the cathode side to reduce the amount of oxygen, and thus the potential that causes carbon corrosion.

It is also known to stop the cathode air flow while maintaining positive anode side hydrogen pressure at shutdown, and to then electrically short the stack to allow the oxygen to be consumed by hydrogen, followed by closing the inlet and outlet valves of the anode and cathode sides, as described in the commonly owned U.S. patent application Ser. No. 11/612,120, titled, "Method of Mitigating Fuel Cell Degradation Due to Startup and Shutdown Via Hydrogen/Nitrogen Storage," filed Dec. 18, 2006, assigned to the assignee of this application and herein incorporated by reference.

It has been proposed in the art to reduce the frequency of the air/hydrogen fronts discussed above by periodically injecting hydrogen into the anode side of a fuel cell stack after the stack has been shut-down. For example, U.S. patent application Ser. No. 12/636,318, filed Dec. 11, 2009, titled Fuel Cell Operation Methods for Hydrogen Addition After Shutdown, assigned to the assignee of this application and herein incorporated by reference, discloses such a method for injecting hydrogen into the anode side of a fuel cell stack during system shut-down. However, at some point, the hydrogen injection process needs to be stopped at which time air will begin to diffuse into the stack. It is necessary to terminate the hydrogen sustaining technique at some point to conserve hydrogen or low voltage battery power for an extended vehicle off times. For these situations, the slow diffusion of oxygen back into the stack causes the catalytic corrosion discussed above. Therefore, it is known to provide cell-to-cell shorting positive temperature coefficient resistors that limit the voltage and electrode damage during the air diffusion. However, to reduce systems costs, it is desirable to eliminate the cell-to-cell resistors because of their expense.

SUMMARY OF THE INVENTION

In accordance with the teachings of the present invention, a system and method are disclosed for reducing the corrosive effects of an air/hydrogen front in a fuel cell stack. The method includes shutting down the fuel cell stack and then initiating a hydrogen sustaining process where hydrogen is periodically injected into an anode side of the fuel cell stack while the stack is shut down for a predetermined period of time. The method determines that the hydrogen sustaining process has ended, and then purges the anode side and a cathode side of the fuel cell stack with air after the hydrogen sustaining process has ended and the stack is still shut-down.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for purging the anode and cathode sides of a fuel cell stack with air after a hydrogen sustaining process of the stack has ended during system shut-down is merely exemplary in nature, and is in no way intended to limit the invention or its applications or uses.

As will be discussed in detail below, the present invention proposes reducing the corrosive effects of air/hydrogen fronts during shut-down and start-up of a fuel cell stack. As discussed above, it is known to periodically inject hydrogen into the anode side of a fuel cell stack after stack shut-down to prevent air from entering the stack for some period of time after the stack has been shut-down, sometimes known as hydrogen-in-park. The hydrogen in the anode side will diffuse through the membranes in each cell, which causes the cathode side to also be filled with hydrogen during the hydrogen-in-park process. Once that period of time has ended and it is no longer beneficial to inject hydrogen within the stack, the present invention then proposes purging the anode and cathode side of the fuel cell stack with air to provide a fast influx of air into the stack that has less of a damaging effect on the catalyst than if the air were allowed to slowly diffuse into the stack. Air purges are known in the art that are performed at system shut-down, but those air purge processes are performed immediately at shut-down and not after the hydrogen-in-park sustaining process has ended. By purging the stack with air after the hydrogen-in-park sustaining process, the shorting resistors that are sometimes provided across the cells in the stack to reduce the voltage potential that would occur if air were allowed to slowly enter to stack can be eliminated.

When the hydrogen sustaining process has exceeded the allowed duration or number of hydrogen refresh cycles, then the air purge is initiated, where one or the other of the anode or cathode side is purged first. As hydrogen/air fronts that are opposite to air are damaging, while opposite hydrogen fronts are not, the purging of the other anode or cathode flow-field is more critical because the first flow-field that is purged would then contain air. Therefore, it is desirable to more quickly purge the second flow-field to limit the electrode damage as a result of the purge. It is also desirable to not add additional components to the system as the motivation for the purge is to reduce cost. In general, the cathode flow-field can be purged more quickly as the anode valves are generally restrictive, the anode flow-field has less flow area and the anode sub-system may have a parallel flow path for anode recirculation.

Figure 1:
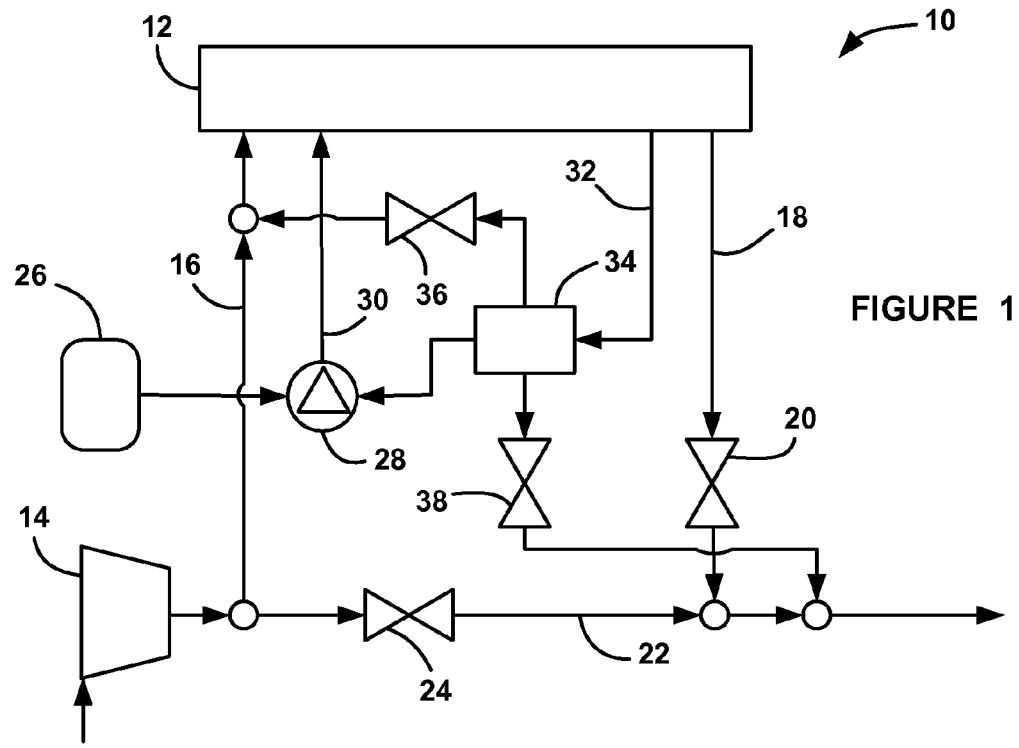
FIG. 1 is a schematic block diagram of a fuel cell system.

FIG. 1 is a schematic block diagram of a fuel cell system 10 including a fuel cell stack 12. The system 10 also includes a compressor 14 that provides compressed cathode air on a cathode input line 16 to the cathode side flow-field in the fuel cell stack 12. The cathode exhaust is output from the fuel cell stack 12 on a cathode exhaust line 18 that includes a cathode back-pressure valve 20 for controlling the cathode side pressure in the stack 12 or, when the valve 20 is closed, preventing cathode flow through the stack 12. The cathode exhaust gas on the cathode exhaust line 18 is then provided to a system exhaust line 22 to be output from the system 10. A cathode by-pass valve 24 is provided in the system exhaust line 22 to allow some or all of the cathode air from the compressor 14 to by-pass the stack 12 and flow directly into the system exhaust line 22.

The system 10 also includes a hydrogen source 26 that provides hydrogen gas to an injector/ejector assembly 28 that may include a suitable combination of an injector, ejector, nozzle, etc., all well understood by those skilled in the art, where the injector in the assembly 28 is operated by a predetermined injector duty cycle to provide pulses of hydrogen gas to the anode side flow-field in the fuel cell stack 12 on an anode input line 30. The width and frequency of the pulses for the injector in the assembly 28 control how much of the hydrogen gas is input to the stack 12 for a certain stack power output density. The anode exhaust gas is output from the fuel cell stack 12 on a recirculation line 32 that provides the anode exhaust gas to a water separator 34 that removes water from the anode exhaust. The dried anode exhaust is then sent back to the injector/ejector assembly 28 to be mixed with the fresh hydrogen from the source 26 on the anode input line 30. A bleed valve 36 is provided to periodically bleed the anode exhaust to remove nitrogen therefrom in a technique that is well understood by those skilled in the art. In this non-limiting design, the bled anode exhaust from the valve 36 is mixed with the air on the cathode input line 16 and is sent to the cathode side of the stack 12, where it is output from the stack 12 on the cathode exhaust line 18, and where the hydrogen in the bled anode exhaust is able to react with air on the cathode catalyst to eliminate hydrogen exhaust emissions from the system 10. A drain valve 38 is coupled to the water separator 34 to drain the water that accumulates therein as a result of the water separation process, which is then provided to the system exhaust line 22 to be removed from the system 10.

The technique or process used for the anode air purge depends on the anode system mechanization. For those systems, such as the system 10, with an upstream bleed valve and a downstream drain valve with respect to the cathode back-pressure valve 20, the anode side is purged first by a steady flow. With the back-pressure valve 20 closed and the bleed valve 36 and the drain valve 38 open, air will flow through the anode sub-system from the compressor 14. Particularly, if the back-pressure valve 20 is closed and the compressor 14 is operating, air from the compressor 14 on the line 16 will travel through the bleed valve 36 in an opposite direction to the bled hydrogen exhaust gas flow, and then flow through two parallel paths. The first path is through the water separator 34, through the drain valve 38 and out of the system 10 on the line 22 to provide an anode recycle side purge, and the second path is through the injector/ejector assembly 28, the anode input line 30, the anode side of the stack 12 and the recirculation line 32, then joining the first path to also flow through the water separator 34, the drain valve 38 and out of the system 10 on the system exhaust line 22 to provide an anode side purge. The cathode by-pass valve 24 is opened, or partially opened, to maintain the desired pressure and to provide dilution of the hydrogen gas flow from the anode side of the stack 12 during the purge. The anode side is purged with at least one stack volume of air, where the air flow is estimated based on the anode flow resistance and the differential pressure. With parallel flow paths for an anode sub-system with anode recycle, the volume flow through each path must be estimated so that the purge duration is adequate for each path. Upon completion of the anode side purge, the bleed valve 36 and the drain valve 38 are closed, and the cathode side of the stack 12 is purged with air by opening the back-pressure valve 20. The air purge is complete when the cathode side has been flushed with air and then the compressor 14 can be turned off and the cathode valves 20 and 24 are closed.

Figure 2:
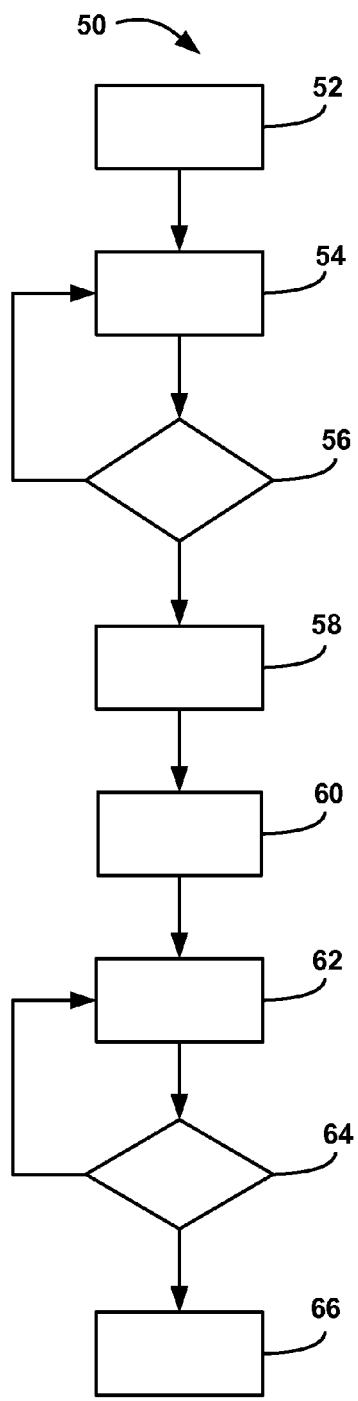
FIG. 2 is a flow chart diagram showing a process for purging the anode and cathode sides of the fuel cell system shown in FIG. 1 at system shut-down.

The operation discussed above is shown in flow chart diagram 50 in FIG. 2. At box 52, the algorithm opens the bleed valve 36 and the drain valve 38, closes the back-pressure valve 20, opens the by-pass valve 24 and starts the compressor 14. Air then flows through both the anode side of the fuel cell stack 12, i.e., through the bleed valve 36, the water separator 34 and the injector/ejector assembly 28, and through the anode recycle side of the system 10 at box 54. The algorithm then determines, at decision diamond 56, whether the air purge of the anode side is complete based on the volume of flow. If the air purge of the anode side is not complete, then the algorithm returns to the box 54 to continue flowing air through the anode side. If the air purge of the anode side is complete at the decision diamond 56, then the algorithm closes the bleed valve 36 and the drain valve 38 at box 58, and opens the back-pressure valve 20 at box 60. With the compressor 14 still operating, air flows through the cathode side of the fuel cell stack 12 at box 62. The algorithm then determines whether the cathode air purge is complete at decision diamond 64, and if not, returns to the box 62 to continue flowing air through the cathode side of the stack 12. If the cathode side purge is complete at the decision diamond 64, then the algorithm turns off the compressor 14 and closes the back-pressure valve 20 and the by-pass valve 24 at box 66.

Figure 3:
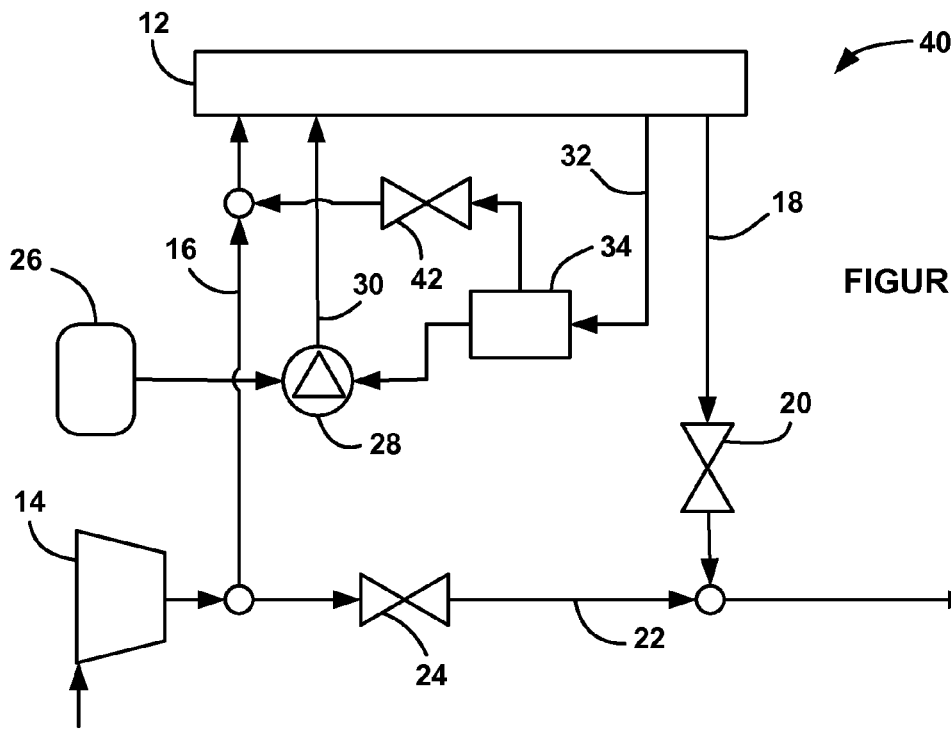
FIG. 3 is a schematic block diagram of another fuel cell system.

FIG. 3 is a schematic block diagram of a fuel cell system 40 similar to the fuel cell system 10, where like elements are identified by the same reference number. In this system design, the drain valve 38 has been eliminated, and the bleed valve 36 has been replaced with a bleed/drain valve 42 that provides both the anode bleed and the water separator drain. The water that is output from the water separator 34 through the valve 42 flows through the cathode side of the stack 12.

For fuel cell systems using a combined bleed and drain valve, such as the system 40, the anode volume is purged by multiple cycles of pressurization with air followed by depressurization. Because this pressurization cycle would also discharge hydrogen from the cathode side, the cathode side is purged first by flowing air through the cathode side with the position of the by-pass valve 24 and the back-pressure valve 20 adjusted to meet emissions requirements. To discharge the anode side hydrogen, the cathode side is pressurized with air by partially closing the back-pressure valve 20, which in turn pressurizes the anode side with air as the anode side is connected to the cathode side by the open bleed/drain valve 42 and the injector/ejector assembly 28. The pressure is then decreased by opening the cathode back-pressure valve 20, which also discharges hydrogen containing gas from the anode side. This pressurization/depressurization cycle is repeated until an adequate amount of hydrogen has been discharged from the anode side of the stack 12. When the air purge is complete, the bleed/drain valve 42 is closed, the compressor 14 is turned off and the back-pressure valve 20 and the by-pass valve 24 are closed. Note that for this approach to function, the bleed/drain valve 42 must be upstream of the back-pressure valve 20, which would typically be the case so that the bled gas can be used for providing hydrogen to the cathode side for catalytic heating during stack warm up.

Figure 4:
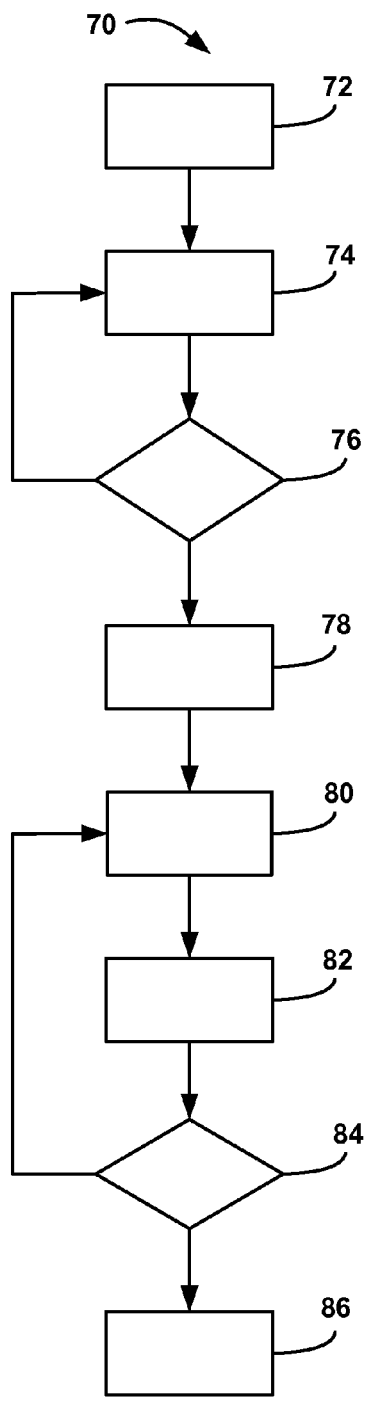
FIG. 4 is a flow chart diagram showing a process for purging the anode and cathode sides of the fuel cell system shown in FIG. 3 during system shut-down.

FIG. 4 is a flow chart diagram 70 showing the operation discussed above for purging the system 40. At box 72, the algorithm opens the by-pass valve 24 and the back-pressure valve 20 and starts the compressor 14. At box 74, air flows through the cathode side of the fuel cell stack 12, and at decision diamond 76 the algorithm determines whether the cathode side is depleted of hydrogen and the cathode side purge is completed. If the cathode side is not depleted of hydrogen at the decision diamond 76, then the algorithm returns to the box 74 to allow air flow through the cathode side flow. If the cathode side is purged of hydrogen at the decision diamond 76, then the algorithm opens the bleed/drain valve 42 at box 78 and partially closes the back-pressure valve 20 to generate cathode and anode side pressure at box 80. The algorithm then fully opens the back-pressure valve 20 to discharge the anode side at box 82, and determines if the air purge of the anode side is complete based on the number of discharges at decision diamond 84. If the anode side purge is not complete at the decision diamond 84, the algorithm returns to the box 80 to generate another cycle of pressure. If the air purge of the anode side is complete at the decision diamond 84, then the algorithm closes the bleed/drain valve 42, turns off the compressor 14, and closes the back-pressure valve 20 and the by-pass valve 24 at box 86.

An inadequate method for anode hydrogen purge is based on an electrical load and oxygen takeover across the membranes, which only consumes hydrogen within the active area of the anode, and does not address hydrogen within the remainder of the anode sub-system. It is desirable to flush the entire anode sub-system with air so that residual hydrogen within the anode sub-system does not diffuse back into the air filled stack and cause elevated cell voltages and electro-carbon corrosion.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for purging a fuel cell stack at stack shut-down, said method comprising:
    shutting down the fuel cell stack;
    initiating a hydrogen sustaining process where fresh hydrogen is periodically injected into an anode side of the fuel cell stack while the stack is shut-down for a predetermined period of time;
    determining that the hydrogen sustaining process has ended; and
    purging the anode side and a cathode side of the fuel cell stack with air after the hydrogen sustaining process has ended and the stack is still shut-down.

2. The method according to claim 1 wherein purging the anode and cathode sides of the fuel cell stack with air includes first purging one of the anode side or cathode side and then purging the other of the cathode or anode side.

3. The method according to claim 2 wherein first purging one of the anode side or cathode side includes first purging the anode side.

4. The method according to claim 3 wherein purging the anode side includes providing a stack purge by closing a cathode back-pressure valve in a cathode exhaust line, opening an anode bleed valve that bleeds an anode exhaust from an anode recirculation line into a cathode input and opening a drain valve that drains a water separator provided in the anode recirculation line, operating a compressor so that air flows through the bleed valve, through the water separator, through an injection assembly that injects fresh hydrogen into the anode side of the fuel cell stack, through an anode flow-field in the stack, into the anode recirculation line, and through the drain valve.

5. The method according to claim 4 wherein purging the anode side also includes providing a recycle purge by flowing the air through the bleed valve, through the water separator and through the drain valve.

6. The method according to claim 4 wherein first purging the anode side or cathode side includes purging the cathode side after the anode side purge has been completed by closing the bleed valve, closing the drain valve and opening the back-pressure valve so air from the compressor flows through a cathode flow-field in the fuel cell stack.

7. The method according to claim 2 wherein first purging one of the anode side or cathode side includes first purging the cathode side.

8. The method according to claim 7 wherein purging the cathode side includes opening a cathode back-pressure valve in a cathode exhaust line and operating a compressor so that air flows into the cathode side of the fuel cell stack and out of the cathode side through the back-pressure valve.

9. The method according to claim 8 wherein first purging the anode side or cathode side includes purging the anode side after the cathode side purge has been completed by opening a bleed/drain valve that bleeds an anode exhaust from an anode recirculation into a cathode input and drains water from a water separator provided in the anode recirculation line into the cathode input, partially closing the cathode back-pressure valve to generate a pressure in both the anode side and the cathode side and then fully opening the cathode back-pressure valve to purge the anode side through the bleed/drain valve, an injection assembly and the back-pressure valve.

10. The method according to claim 9 wherein partially closing the cathode back-pressure valve and then fully opening the cathode back-pressure valve to purge the anode side are repeated to completely remove the hydrogen from the anode side.

11. A method for purging a fuel cell stack at stack shut-down, said stack including an anode side and a cathode side, said stack being part of a fuel cell system including a compressor that provides cathode air to the cathode side of the stack, an injection assembly that injects fresh hydrogen gas into the anode side of the fuel cell stack, a back-pressure valve provided in a cathode exhaust line from the fuel cell stack, a water separator for separating water in an anode recirculation line that recirculates an anode exhaust gas from the stack back to the injection assembly, a bleed valve for bleeding anode exhaust gas from the recirculation line into the cathode side and a drain valve for draining water from the water separator, said method comprising:
    shutting down the fuel cell stack;
    initiating a hydrogen sustaining process where fresh hydrogen is periodically injected into the anode side of the fuel cell stack while the stack is shut down for a predetermined period of time;
    determining that the hydrogen sustaining process has ended;
    purging the anode side of the fuel cell stack with air after the hydrogen sustaining process has ended and the stack is still shut-down; and
    purging the cathode side of the fuel cell stack with air after the anode side has been purged.

12. The method according to claim 11 wherein purging the anode side includes providing a stack purge by closing the back-pressure valve, opening the bleed valve, opening the drain valve, operating the compressor so that air flows through the bleed valve, through the water separator, through the injection assembly, through an anode flow-field in the stack, into the anode recirculation line, and through the drain valve.

13. The method according to claim 12 wherein purging the anode side also includes providing a recycle purge by flowing the air through the bleed valve, through the water separator and through the drain valve.

14. The method according to claim 12 wherein purging the cathode side includes closing the bleed valve, closing the drain valve and opening the back-pressure valve so air from the compressor flows through a cathode flow-field in the fuel cell stack.

15. A method for purging a fuel cell stack at stack shut-down, said stack including an anode side and a cathode side, said stack being part of a fuel cell system including a compressor that provides cathode air to the cathode side of the stack, an injection assembly that injects fresh hydrogen gas into the anode side of the fuel cell stack, a back-pressure valve provided in a cathode exhaust line from the fuel cell stack, a water separator for separating water in an anode recirculation line that recirculates an anode exhaust gas from the stack back to the injection assembly, a bleed/drain valve for bleeding anode exhaust gas from the recirculation line into the cathode input and for draining water from the water separator into the cathode input, said method comprising:

shutting down the fuel cell stack;

initiating a hydrogen sustaining process where fresh hydrogen is periodically injected into the anode side of the fuel cell stack while the stack is shut down for a predetermined period of time;

determining that the hydrogen sustaining process has ended;

purging the cathode side of the fuel cell stack with air after the hydrogen sustaining process has ended and the stack is still shut-down; and purging the anode side of the fuel cell stack with air after the cathode side has been purged.

16. The method according to claim 15 wherein first purging the cathode side includes opening the back-pressure valve and operating the compressor so that air flows into the cathode side of the fuel cell stack and out of the cathode side through the back-pressure valve.

17. The method according to claim 16 wherein purging the anode side includes opening the bleed/drain valve, partially closing the cathode back-pressure valve to generate a pressure in both the anode side and the cathode side and then fully opening the cathode back-pressure valve to purge the anode side through the bleed/drain valve, the injection assembly and the back-pressure valve.

18. The method according to claim 17 wherein partially closing the cathode back-pressure valve and then fully opening the cathode back-pressure valve to purge the anode side are repeated to completely remove the hydrogen from the anode side.

* * * * *